United States Patent [19]
Gaskill et al.

[11] Patent Number: 5,518,211
[45] Date of Patent: May 21, 1996

[54] UTENSIL-HOLDER FOR CONTAINERS

[76] Inventors: Garold B. Gaskill; Teresa M. Gaskill, both of 10285 SW. Moratoc Dr., Tualatin, Oreg. 97062

[21] Appl. No.: 296,315

[22] Filed: Aug. 24, 1994

[51] Int. Cl.⁶ ................................................. A47G 21/14
[52] U.S. Cl. ............................ 248/37.6; D7/641; 24/339; 211/69.8; 211/120; 220/735; 248/113
[58] Field of Search .................... 248/37.6, 37.3, 248/113, 110, 111, 112, 231.8; 220/735, 736, 912; 211/70.7, 120, 69.8; 24/329, 336, 339, 563, 543; D10/46.2; D7/401.2, 641

[56]                References Cited
            U.S. PATENT DOCUMENTS

| D. 265,622 | 8/1982 | Bartels | D7/641 |
|---|---|---|---|
| 625,435 | 5/1899 | Clark | 248/37.6 |
| 984,381 | 2/1911 | Marshel | 211/120 |
| 1,211,171 | 1/1917 | Kershner | 248/37.6 |
| 1,464,731 | 8/1923 | Smith | 248/37.6 |
| 1,483,833 | 2/1924 | Potter | 248/37.6 |
| 1,705,339 | 3/1929 | Plottle | 211/69.8 |
| 2,164,649 | 7/1939 | Forbes | 248/37.6 |
| 2,368,898 | 2/1945 | Swift, Jr. | 248/37.6 |
| 2,713,469 | 7/1955 | Wright | 248/37.6 X |
| 3,931,668 | 1/1976 | Hombach | 248/37.6 |

*Primary Examiner*—Ramon O. Ramirez
*Attorney, Agent, or Firm*—Marger, Johnson, McCollom & Stolowitz

[57]                ABSTRACT

A utensil-holder supported by a vessel, such as a pot, and permits a hand held utensil, such as a spoon, to be held until needed. The utensil for stirring, serving or other operations is held conveniently above the vessel and when not in use placed and held in a position over the vessel permitting any residual contents from the vessel on the utensil to fall back into the vessel.

4 Claims, 3 Drawing Sheets

5,518,211

UTENSIL-HOLDER FOR CONTAINERS

BACKGROUND OF THE INVENTION

The present invention relates to holding household utensils and more particularly to attaching a hand held household utensil to a container.

When cooking liquids such as sauces in a pot, spoons are often used for the occasional stirring required. When the spoon is not in use it is often laid down on the counter, or in a special spoon holder 1 laying on the counter (FIG. 1). In either case the spoon including the residual sauce may drip causing waste and requiring the counter or holder to be washed. Occasionally as the spoon is moved from the pot of liquid to the spoon holder some sauce clinging to the spoon will drip off onto the counter causing needless washing of the counter in addition to the spoon and spoon holder.

Sometimes, if the spoon is long enough, it can be leaned against the inside wall of the pot, pan or skillet containing the sauce or liquid thereby eliminating the dripping onto the counter. The spoon in this situation, if metal, can become hot and uncomfortable to hold. The spoon may also be deep enough in the pot to permit contact of the spoon handle with the contents of the pot. Thus, the spoon handle becomes very messy and difficult to hold.

If the spoon is not long enough, which is quite often the case, it falls down into the sauce and must then be retrieved by yet another utensil causing further washing and needless frustration for the cook. Some utensils used for commercial cooking have a hook at the end of the handle to hold the utensil on the lip of a deep pot. Again the handle may touch the pot's side wall, and hence the contents of the pot, causing the handle to become very messy and difficult to hold. While handles with hooked ends may be adequate for commercial purposes, most household utensils have no hooks. Clearly a better method for holding and retrieving a household hand held utensil is needed.

SUMMARY OF THE INVENTION

It is an object of the present invention to reduce waste of residual contents carried on an utensil after being used to stir, mix or serve the vessel contents in a container.

It is a further object of the present invention to reduce the time and effort required to wash utensils and utensil support surfaces after the utensils and surfaces used to prepare and mix various substances.

It is yet a further object of the present invention to make a conventional hand held utensil readily and safely available for stirring, serving or other operation.

The foregoing objects and advantages are achieved by having an utensil-holder attached or otherwise supported appropriately to a vessel or container of interest. An utensil-holder held by the vessel of interest, such as a pot, and permits a hand held utensil, such as a spoon, to be held by the utensil-holder until needed. The utensil, when not in use, is attached to the utensil-holder in a position over the vessel permitting any residual contents from the vessel on the utensil to fall back into the vessel. The utensil, when attached to the utensil-holder, is conveniently available to be removed from the utensil-holder and used for stirring, serving or other operation in or around the vessel.

The foregoing features and advantages of the present invention will be more readily apparent from the following detailed description thereof, which proceeds with reference to the accompanying drawings.

DETAILED DESCRIPTION OF THE INVENTION

Figure 1:
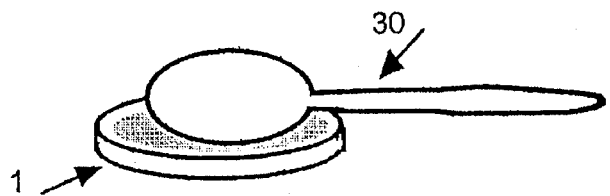
FIG. 1 shows a prior art curved counter spoon rest with spoon.
Figure 2:
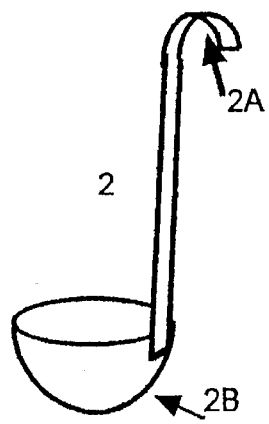
FIG. 2 shows a prior art commercial ladle with a hook.

Referring to FIG. 1, a spoon 30 is shown resting in a custom designed spoon rest 1. Referring to FIG. 2, a commercial ladle 2 is shown with a hook on the handle 20A which is used to rest on the pot rim.

Figure 3:
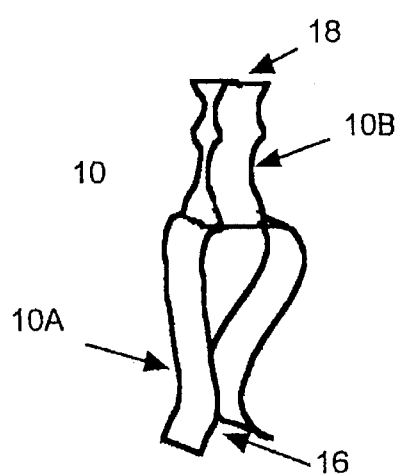
FIG. 3 shows an utensil-holder according to the invention.
Figure 4:
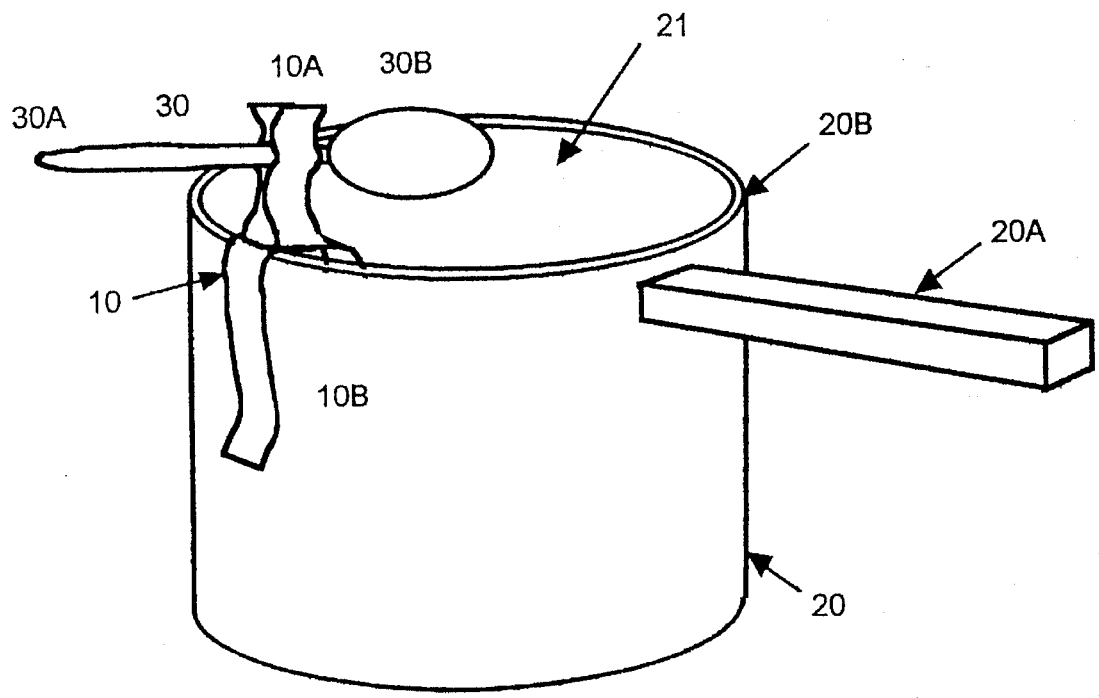
FIG. 4 shows the utensil-holder in FIG. 3 attached to a pot and holding a spoon.

Referring to FIGS. 3 and 4, an utensil-holder 10 includes a lower clip portion 10A attached to an upper clip portion 10B. The clips 10A and 10B are each made from spring steel. An upper slot 18 and a lower slot 16 are formed in the upper clip 10B and lower clip 16, respectively, between the opposite leafs of the "U-shaped" spring clips. The upper and lower slots extend in opposed directions and are aligned in perpendicular orientations.

The leaves of lower clip 10A are separated into an open position for receiving a portion of a vessel, such as pot 20 shown in FIG. 4. The lower clip 10A is then springingly retracts into a closed position about opposite sides of pot wall 20B, holding the upper clip 10B above a top opening 21 of pot 20. The leafs of upper clip 10B are also spread into an open position for receiving an utensil such as spoon 30 (FIG. 4) and springingly retractable into a closed position around opposite sides of utensil handle 30A.

Thus, utensil-holder 10 attaches to the pot, pan or other vessel side wall 20B while upper clip 10B is used to hold a spoon or other hand held utensil 30. By holding the utensil handle 30A and rotating the utensil handle up and in toward the center of pot 20, spoon 30 is moved in and out of upper clip 10A. Lower clip 10B is securely attached to the pot wall 20B so that the utensil-holder 10 is not pulled off while the spoon 30 is removed.

If spoon 30 is placed in the holder at a point on the spoon where there is no clinging liquid and the level of the liquid is below lower clip 10A then the utensil-holder 10 will not need to be washed—thus saving time. In this position, the utensil 30 is in sight and readily available for stirring or other purposes.

Figure 5:
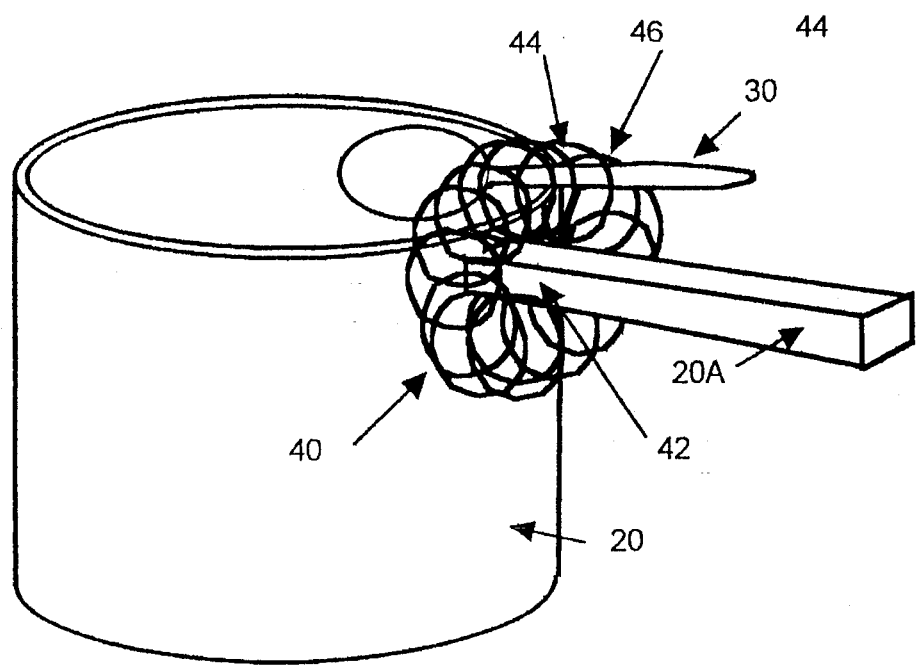
FIG. 5 shows an alternative embodiment of the invention using a circular spring.

Other embodiments of the invention also allow utensils to be held above the top of a container. For example, referring to FIG. 5, an alternative embodiment consists of a spring 40 formed into a circle which is placed around a handle 20A of the pot 20 as a method of attaching the utensil-holder to the pot. The spring 40 is expanded so that a center hole or slot 42 in spring 40 slidingly receives handle 20A. The spring then contracts conforming snugly around the handle 20A. Slots between adjacent coils 44 and 46 are then used to receive and hold utensil 30.

Figure 6:
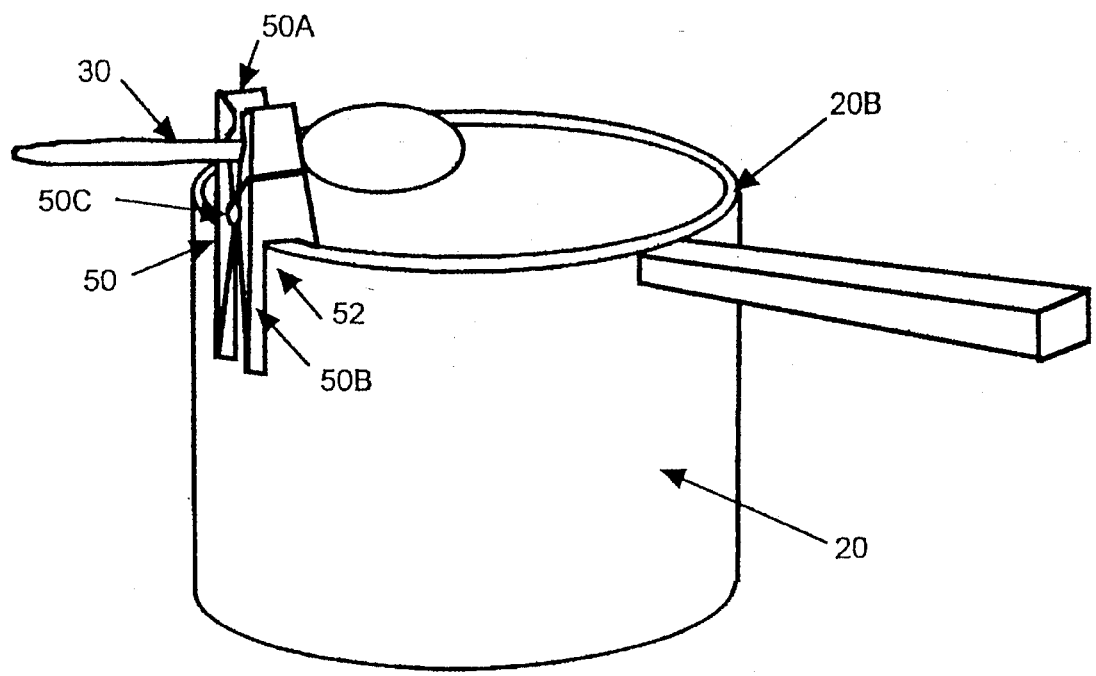
FIG. 6 shows another embodiment of the invention using some concepts of a conventional cloth's pin.

Referring to FIG. 6, another embodiment of the invention includes using a clip 50 having a design similar to the common clothes' pin. The clip 50 has a first finger 50A and a second finger 50B attached together with a spring 50C. A bottom end of each finger has a slit 52 for slidingly receiving the side wall 20B of the pot 20. The slits 52 are aligned together in a bottom portion of first and second fingers, respectively. The first and second fingers form a second slit which are moved apart to receive the handle of spoon 30. The fingers are then compressed together by spring 50C holding the handle of spoon 30 in compression.

Figure 7:
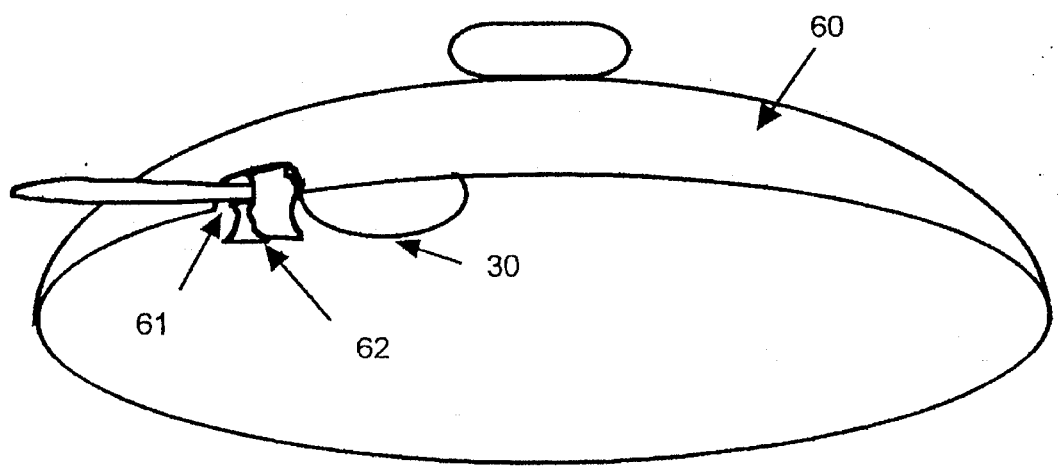
FIG. 7 shows another embodiment of the utensil-holder attached to a conventional lid.

Referring to FIG. 7, a lid 60 covers the top opening of a pot. For example, lid 60 attaches onto and covers the top of pot 20 previously shown in FIG. 4. The lid 60 includes a clip 2 similar to upper clip 10B shown in FIG. 3. The clip 62 attaches to the underside of lid 60 for receiving an utensil such as spoon 30. The lid 60 includes a cut-out 61 that permits a portion of the handle of spoon 30, or other hand-held utensil, to protrude out beyond the parameter of lid 60 and above a bottom edge. Cut-out 61 allows the lid to be fully cover the top of a pot while the spoon handle extends outside the exterior of the lid. Thus, the handle can reside outside the interior sections of the lid and pot during cooking sessions allowing the spoon handle to remain cool.

Figure 8:
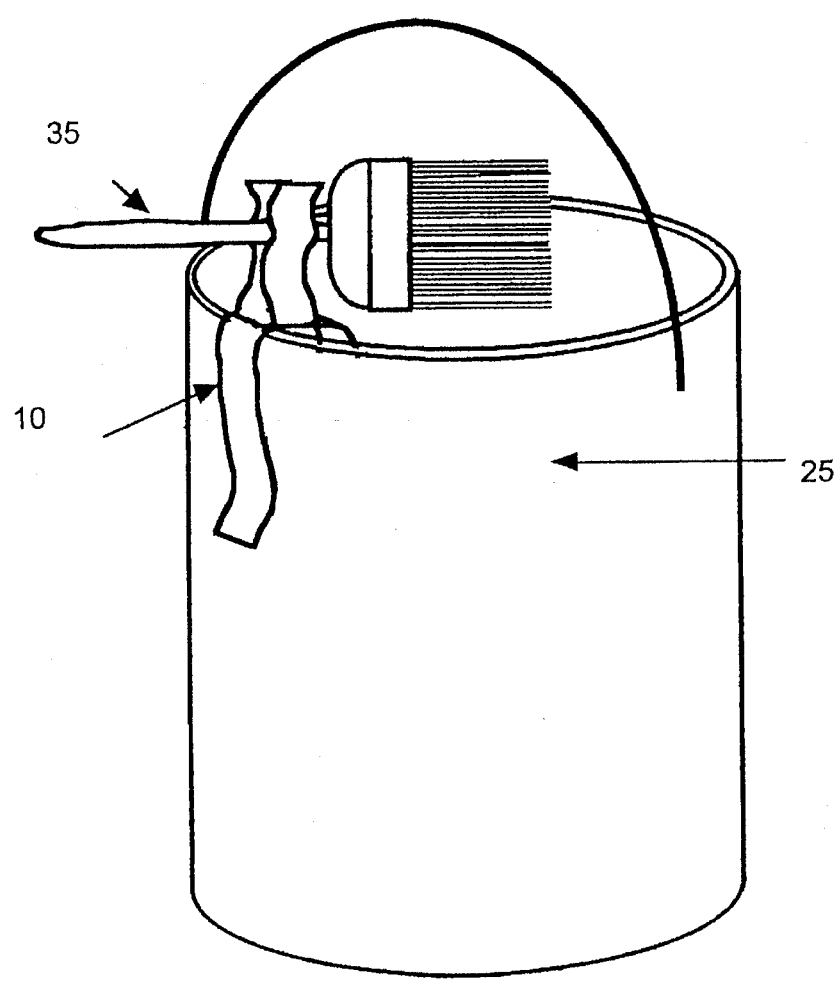
FIG. 8 shows the utensil-holder shown in FIG. 3 holding a paint brush over a paint pail.

The utensil-holders shown above may perform more functions than that of holding a stirring spoon for a pot. For example, the utensil-holder may also be used to hold a serving spoon or other utensil to serve foods or liquids from a serving dish. The utensil-holder may also be used to hold a spoon over a cup or mug. Referring to FIG. 8, the utensil-holder in a larger form may also be used to hold a paint brush 35 over a can of paint 25.

In view of the many possible embodiments and uses to which our invention is applicable, it should be recognized that the detailed embodiment is illustrative only and should not be taken as limiting the scope of our invention. Rather, we claim as our invention all such embodiments as may fall within the scope and spirit of the following claims and equivalents thereto.

We claim:

1. A method of holding an utensil to a container having a top opening using an utensil-holder comprising:

attaching the utensil to the utensil-holder;

supporting the utensil-holder with the container so that a portion of the utensil is positioned above the container; and attaching the utensil-holder to a lid attachable over the top opening of the container, the container supporting the lid and the utensil-holder.

2. A method according to claim 1 including covering the top opening of the container with the lid while a portion of the utensil extends outside a perimeter edge of said lid.

3. A device for supporting an utensil on a vessel, comprising:

first attachment means comprising a lid for placing over a top opening of the vessel; and second attachment means rigidly joined to a bottom side of said lid, the second attachment means slidingly receiving and holding a portion of the utensil above the vessel.

4. A device according to claim 3 wherein the lid includes a cut-out allowing a portion of the utensil to extend outside a perimeter edge of the lid while the lid is covering the vessel.

* * * * *